United States Patent Office 2,905,666
Patented Sept. 22, 1959

2,905,666

SENSITIZING DYES FROM 2-METHYL-4,5-DI-HYDRO-BETA-NAPHTHOTHIAZOLE

George de Stevens, Portland, Conn., assignor to Sperry Rand Corporation, a corporation of Delaware No Drawing. Application May 10, 1955
Serial No. 507,459

16 Claims. (Cl. 260—240)

My invention relates to the production of sensitizing dyes from a new heterocyclic base which I have designated as 2-methyl-4,5-dihydro-β-naphthothiazole.

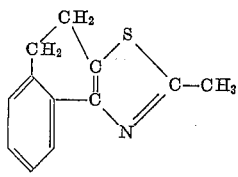

Cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain.

I have now found that it is possible to prepare cyanine dyes in which one or both of the above mentioned auxochromic nitrogen atoms lie in a 4,5-dihydro-β-naphthothiazole nucleus. I have further found that these new cyanine dyes sensitize photographic emulsions strongly and cleanly, i.e. without producing excessive fog or residual dye stain.

It is accordingly an object of my invention to provide new cyanine dyes. A further object is to provide photographic emulsions sensitized with such dyes. Other objects will appear hereinafter.

As starting material for the preparation of my new dyes I employ 2-alkyl-4,5-dihydro-β-naphthothiazoles, particularly 2-methyl-4,5-dihydro-β-naphthothiazole. I first convert these alkyl-4,5-dihydro-β-naphthothiazole bases to quaternary salts by reacting the base with esters, such as alkyl halides, alkyl sulfates, or alkyl-p-toluene sulfonates, for example. For purposes of convenience the quaternary salts useful in practicing this invention can be represented by the following single formula:

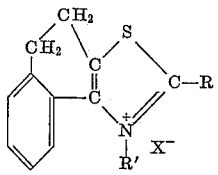

wherein R' represents an alkyl group, e.g. methyl, ethyl, n-propyl, isobutyl, n-butyl, β-hydroxyethyl, β-methoxyethyl, α-ethoxyethyl, β-acetoxyethyl, β-carboxyethyl, carboxymethyl, β-carbomethoxyethyl, β-carbethoxyethyl, allyl, etc. or an aralkyl group, e.g. benzyl, phenyl, ethyl, etc., R represents methyl, ethyl or n-propyl and X⁻ represents an anion, e.g. chloride, bromide, iodide, benzene sulfonate, p-toluene sulfonate, methyl sulfate, ethyl sulfate, thiocyanate perchlorate, acetate, etc.

To prepare pseudocyanine dyes from such quaternary salts I react the quaternary salts with α-halogenoquinoline quaternary salts, in the presence of an acid binding agent, such for example, as sodium ethylate, sodium carbonate, pyridine or a strong organic base (e.g. triethyl amine, trimethalamine and N-methyl piperidine). I have found it advantageous to employ a mixture of pyridine with a strong tertiary organic base.

Instead of 2-halogenoquinoline quaternary salts I can employ 2-alkyl mercapto or 2-aryl mercapto quinoline quaternary salts to condense with the quaternary salts of 2-alkyl-4,5-dihydro-β-naphthothiazole, in the presence of an acid binding agent.

Using 2-halogenopyridine quaternary salts instead of 2-halogenoquinoline quaternary salts I can prepare pyridocyanine dyes containing a 4,5-dihydro-β-naphthothiazole nucleus.

Using 2-alkyl mercapto or 2-aryl mercapto benzothiazole or naphthothiazole salts I can prepare simple cyanine dyes other than pseudocyanine dyes.

To prepare symmetrical carbocyanine dyes from 2-alkyl-4,5-dihydro-β-naphthothiazole quaternary salts, I react the quaternary salts with esters of ortho acids, e.g. ethylorthoformate, ethylorthoacetate, ethyl orthopropionate and ethyl orthobenzoate in the presence of pyridine or a mixture of pyridine and triethyl amine.

To prepare unsymmetrical carbocyanine dyes from 2-alkyl-4,5-dihydro-β-naphthothiazole quaternary salts I react the quaternary salts with cycloammonium quaternary salts containing a β-aryl aminovinyl group in the alpha or gamma position, i.e. in one of the so-called reactive positions in the presence of an acid binding agent, e.g. pyridine or pyridine plus triethyl amine.

To prepare styryl dyes from my new quaternary salts I condense them with p-dialkyl aminobenzaldehyde in the presence of an alkaline catalyst, e.g. piperidine in absolute ethanol solution.

To prepare merocarbocyanine dyes from 2-alkyl-4,5-dihydro-β-naphthothiazole quaternary salts I condense the quaternary salts with ketomethylene heterocyclic intermediates containing an aryl amino-methylene group in the 5-position in the presence of an acid binding agent, e.g. pyridine plus triethyl amine. Examples of such ketomethylene intermediates are 5-acetanilido methylene-3-ethyl rhodanine, 5-acetanilidomethylene-3-ethyl-1-phenyl-2-thiohydantoin, etc.

To sensitize photographic silver halide emulsions with my new dyes, I disperse the dyes in the emulsions. My invention is particularly directed to the customarily employed gelatino-silver-halide emulsions, such as the gelatino-silver-bromide, bromiodide, chloride and chlorobromide for example. The methods of incorporating dyes in emulsions are simple and well known to those skilled in the art and described in various patents and publications, for example, U.S. Patent 2,336,843, patented December 14, 1943.

It is well known that cyanine dyes resonate between two extreme forms and that a cyanine dye can be represented by either of the two extreme forms. Thus, the unsymmetrical type of instant dyes can be represented by either of the following formulas.

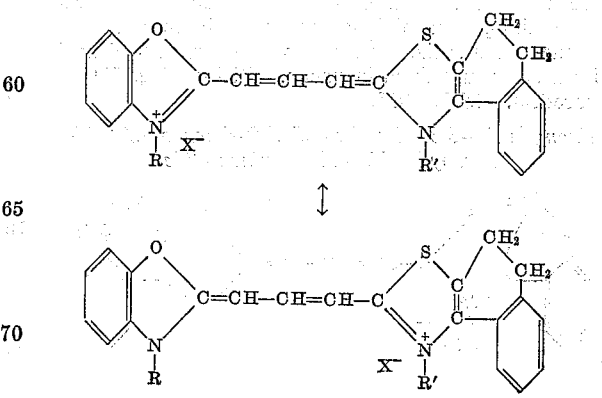

The following examples will serve to illustrate my invention and the method of preparation of the dyes.

*Example 1.—2-methyl-4,5-dihydro-β-naphthothiazole*

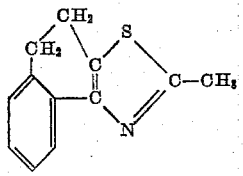

110 g. (1 mol) of 2-bromo-tetralone (Wilds, J.A.C.S. 68, 86 (1946)), 36.5 g. (1 mol) of thioacetamide and 175 ml. of absolute ethyl alcohol were heated slowly on the steam bath under reflux. Within a short time a vigorous reaction ensued and a copious white solid precipitated. After the reaction subsided, the mixture was refluxed on the steam bath for 3 hours. The alcohol was then distilled off and the chilled residue was made alkaline with $NH_4OH$ and this solution was thoroughly extracted with ether. The ether extract was dried over $K_2CO_3$. The ether was then removed by distillation and the residue was distilled at reduced pressure. 2-methyl-4,5-dihydro-β-naphthothiazole was collected in 41% yield at 136°–137° at 1.5 mm. pressure.

*Example 2.—2-methyl-4,5-dihydro-β-naphthothiazole metho-p-toluene sulfonate*

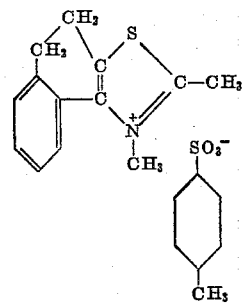

17 g. (1 mol) of 2-methyl-4,5-dihydro-β-naphthothiazole and 16.8 g. (1 mol plus 10% excess) of methyl-p-toluene sulfonate were heated in an oil bath at 120° for 1 hour and then on the steam bath for 4 hours. The resulting solid cake was washed well with ether, then acetone and dried in vacuo. Yield: 23 g. 72% of theoretical. M.P. 155°.

*Example 3.—2-methyl-4,5-dihydro-β-naphthothiazole ethiodide*

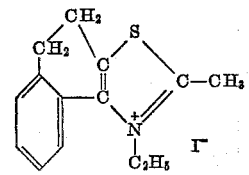

17 g. (1 mol) of 2-methyl-4,5-dihydro-β-naphthothiazole and 14.6 g. (1 mol plus 10% excess) of ethyl iodide were heated under reflux on the steam bath for 1 week. The resulting semi-solid was washed with ether and then acetone. It was then collected on a filter, washed again with acetone and dried in vacuo. Yield: 16 g. 53% of theoretical. M.P. 205°.

*Example 4.—3,3'-dimethyl-4,5,4',5'-dibenzo-6,7,6',7'-tetrahydrothiacarbocyanine iodide*

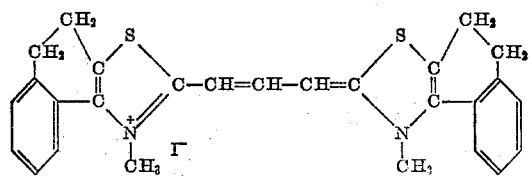

5 g. (1 mol) of 2-methyl-4,5-dihydro-β-naphthothiazole methyl-p-toluene sulfonate, 5.7 g. (1 mol plus 200% excess) of ethyl orthoformate and 20 ml. of pyridine were refluxed for 3½ hours. After chilling the reaction mixture overnight, the precipitate was collected on a filter, washed well with water, then acetone and air dried. The crude dye was dissolved in 100 ml. of boiling methyl alcohol and to this was added 2 g. of NaI dissolved in 20 ml. of methyl alcohol. A precipitate was immediately obtained. An additional 200 ml. of methyl alcohol was added to the boiling mixture to bring the dye completely into solution. On cooling, green needles were obtained which were collected on a filter and washed with methyl alcohol. Yield of crude dye: 0.5 g. 14%. It was purified by recrystallizing twice from methyl alcohol (300 ml. per gram). The yield of olive green velvet-like needles was 8%, M.P. 244°–245°. A solution of the dye in methyl alcohol was blue with an absorption maximum at 586 mu.

*Example 5.—3,3'-diethyl-4,5,4',5',-dibenzo-6,7,6',7',-tetrahydrothiacarbocyanine iodide*

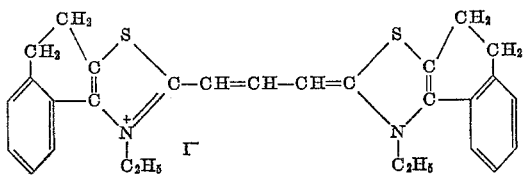

5 g. (1 mol) of 2-methyl-4,5-dihydro-β-naphthothiazole ethiodide, 5.7 g. (1 mol plus 200% excess) of ethyl orthoformate and 25 ml. of pyridine were refluxed for 3½ hours. After chilling the reaction mixture overnight, green needles were precipitated which were collected on a filter, washed well with water, then acetone and air dried. In this manner, 1.6 g. (38%) of crude dye was obtained. The dye was recrystallized twice from methyl alcohol to give a 29% yield of green needles with a golden reflex, melting at 244° d. A solution of the dye in methyl alcohol was blue with an absorption maximum at 586 mu.

*Example 6.—3,3'-diethyl-4',5'-benzo-6',7'-dihydro oxathiocarbocyanine iodide*

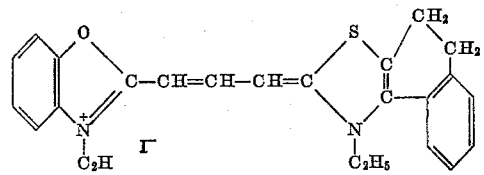

1.8 g. (1 mol) of 2-methyl-4,5-dihydro-β-naphthothiazole ethiodide and 2.4 g. (1 mol) of 2-β-acetanilidovinyl benzoxazole ethiodide were dissolved in 15 ml. of boiling absolute ethyl alcohol. To this solution was added 1 g. (2 mol) of triethylamine and the whole was refluxed for 15 minutes. After chilling overnight, the dye crystals were collected on a filter, washed well with water, then acetone, and dried in vacuo. The yield of crude dye was 70%. After two recrystallizations from methyl alcohol (100 ml. per gram) 1.2 g. (46%) of pure dye in the form of fine dark green needles, M.P. 224° d., was obtained. A solution of the dye in methyl alcohol was red with an absorption maximum at 530 mu.

*Example 7.—1'-ethyl-3-methyl-4,5-benzo-6,7-dihydro-thia-2'-cyanine iodide*

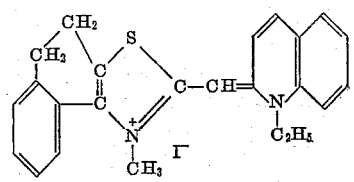

1.9 g. (1 mol) of 2-methyl-4,5-dihydro-β-naphthothiazole methyl-p-toluene sulfonate and 2.0 g. (1 mol) iodoquinoline ethiodide were dissolved in 15 ml. of boiling absolute ethyl alcohol. To this solution was added 1 g. (1 mol) of triethylamine and refluxing was continued for 30 minutes. A copious precipitate was formed, which, after chilling was collected on a filter, washed well with water, then acetone and air dried. Recrystallization from methyl alcohol (200 ml. per gram) gave pure dye in 24% yield. This dye was obtained in the form of bright red needles, melting at 246° with decomposition. A solution of the dye in methyl alcohol was orange with an absorption maximum at 490 mu.

*Example 8.—2-p-dimethyl aminostyryl-4,5-dihydro-β-naphthothiazole methiodide*

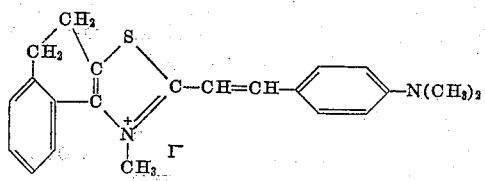

3.9 g. (1 mol) of 2-methyl-4,5-dihydro-β-naphthothiazole methyl-p-toluene sulfonate and 1.5 g. of p-dimethylaminobenzaldehyde were dissolved in 25 ml. of absolute ethyl alcohol. A drop of piperidine was added to this solution and refluxing was continued for 40 minutes. 5 g. of NaI dissolved in 10 ml. of ethyl alcohol was added to the reaction mixture which was refluxed for an additional 5 minutes. After chilling overnight, the precipitate was collected on a filter, washed well with water, then acetone and air dried. In this manner, 1.0 g. (21%) of crude dye was obtained. The dye was recrystallized twice from methyl alcohol (250 ml. per gram) and a 5% yield of pure dye was obtained in the form of red needles with a blue reflex, M.P. 215–216°. A methyl alcohol solution of the dye had an absorption maximum at 496 mu.

*Example 9.—1,3'-diethyl-3,3-dimethyl-4',5'-benzo-6',7'-dihydropseudoindolothia-carbocyanine iodide*

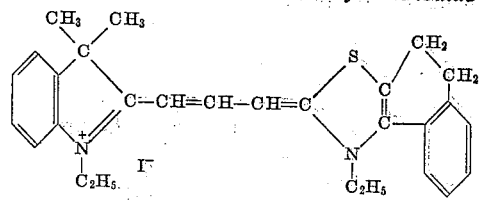

1.8 g. (1 mol) of 2-methyl-4,5-dihydro-β-naphthothiazole ethiodide, 1.1 g. (1 mol) of 1-ethyl-3,3-dimethyl-formal-methylene indolenene and 15 ml. of acetic anhydride were refluxed for 20 minutes. After chilling overnight, the precipitate was collected on a filter, washed well with water, then acetone and dried in vacuo. The crude dye was recrystallized twice from methyl alcohol (300 ml. per gram). The yield of pure dye was 4%. It was obtained as dark needles with a green reflex, M.P. 195°. A methyl alcohol solution of the dye has an absorption maximum at 546 mu.

*Example 10.—3-ethyl-5-(1-methyl-4,5-dihydro-β-naphthothiazolylidene) ethylidene rhodanine*

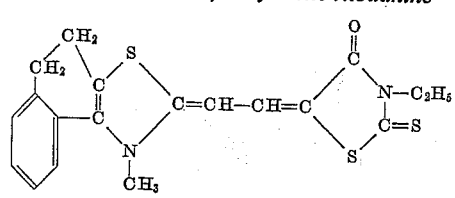

1.9 g. (1 mol) of 2-methyl-4,5-dihydro-β-naphthothiazole methyo-p-toluene sulfonate, 1.5 g. (1 mol) of 5-acetanilidomathylene-3-ethyl rhodanine, 15 ml. of absolute ethyl alcohol and 1 g. (2 mol) of triethylamine were refluxed for 15 minutes. After chilling overnight, the dye crystals were collected on a filter, washed well with water, then acetone and air dried. The yield of crude dye was 84%. The dye was purified by dissolving it in boiling pyridine and precipitating by the addition of methyl alcohol. The pure dye was obtained in the form of felted dark red needles with greenish reflex in a 68% yield, melting at 291° with decomposition. A methyl alcohol solution of the dye had an absorption maximum at 554 mu.

*Example 11.—3,3'-diethyl-9-methyl-6',7'-dihydro-4',5'-benzothiacarbocyanine iodide*

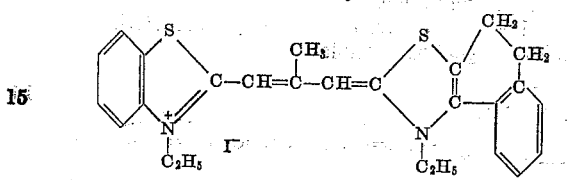

2.1 g. (1 mol) of 2-(2-methyl mercapto propenyl) benzothiazole ethyl-p-toluene sulfonate and 1.8 g. (1 mol) of 2-methyl-4,5-dihydro-β-naphthothiazole ethiodide were dissolved in 15 ml. of boiling absolute ethyl alcohol. To this solution was then added 0.5 g. (2 mol) of triethylamine and refluxing was continued for 15 minutes. After chilling overnight, the precipitate was collected on a filter, washed well with water, then acetone and dried in vacuo. In this manner, 1.1 g. (40%) of crude dye was obtained. After two recrystallizations from methyl alcohol (200 ml. per gram) 30% yield of pure dye was obtained in the form of fine green needles with golden reflex, M.P. 250° d. A solution of the dye in methyl alcohol is reddish purple and has an absorption maximum at 550 mu.

*Example 12.—[1-ethyl-2(4,5-dihydro-β-naphtho thiazole)] [1 phenyl -2,5-dimethyl-3-pyrrole] dimethine cyanine iodide*

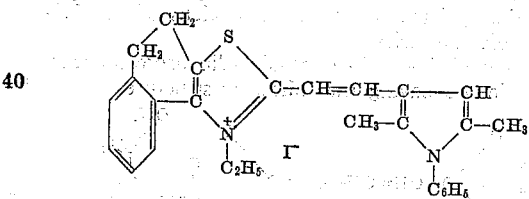

1.0 g. (1 mol) of 1-phenyl-2,5-dimethyl-3-pyrrole aldehyde, 1.75 g. (1 mol) of 2-methyl-5,6-dihydro-β-naphthothiazole ethiodide, 15 cc. of absolute ethyl alcohol and 3 drops of piperidine were refluxed for 90 minutes. After chilling overnight, the precipitate was collected on a filter, washed well with water, then acetone and air dried. The yield of pure dye obtained of bright yellow crystals, M.P. 226°–227° d. was 13% of theoretical. A methanol solution of the dye gave a yellow color with an absorption maximum at 456 mu.

In the foregoing, I have described my invention so that it may be practised by those skilled in the art, and I have particularly pointed out the features of novelty, which I believe to be characteristic of my invention in the following claims. It will be understood, however, that modifications and changes may be made without departing from the spirit and substance of my invention, as will be clear to those skilled in the art.

I claim:

1. A dye selected from the group characterized by the following general formula:

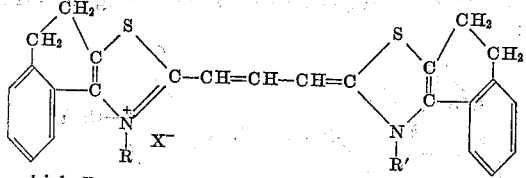

in which R and R' respectively, represent a member selected from the group consisting of alkyl and aralkyl groups and X⁻ represents an acid radical.

2. 3,3' - dimethyl-4,5,4',5'-dibenzo-6,6',7,7'-tetrahydrothiacarbocyanine iodide having the structure:

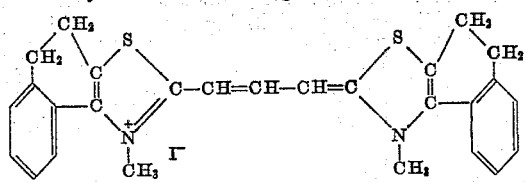

3. 3,3' - diethyl - 4,5,4',5' - dibenzo-6,6',7,7'-tetrahydrothiacarbocyanine iodide.

4. A dye selected from the group characterized by the following general formula:

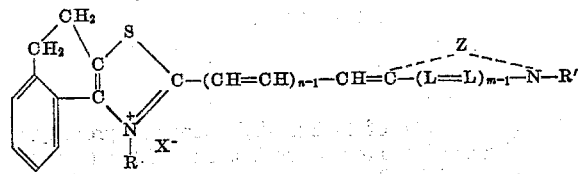

in which R and R' respectively represent a member selected from the group consisting of alkyl and aralkyl groups, L represents a methine group, $m$ represents a positive integer from 1 to 2, $n$ represents a positive integer from 1 to 3, both inclusive, $X^-$ represents an acid radical and Z represents the non-metallic atoms necessary to complete a heterocyclic nucleus containing from 5 to 6 atoms in the heterocyclic ring, said heterocyclic nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series.

5. 3,3' - diethyl - 4',5'-benzo-6',7'-dihydrooxathiacarbocyanine iodide having the following structure:

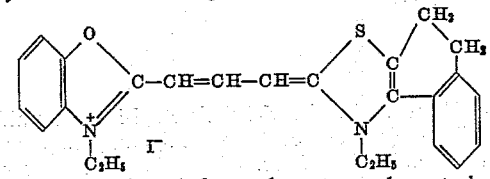

6. A dye selected from the group characterized by the following general formula:

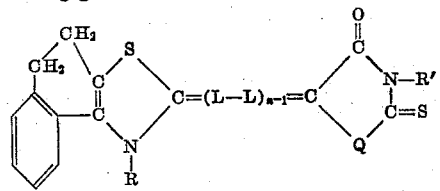

where R represents a member selected from the group consisting of alkyl, aralkyl and aryl groups, R' represents a member selected from the group consisting of alkyl and aryl groups, L is a methine group, $n$ is a positive integer of from 1 to 4, both inclusive, and Q is a member selected from the group consisting of oxygen, sulfur, selenium and =N-R'.

7. 3 - ethyl - 5 - [(1-methyl-4,5-dihydro-β-naphthothiazolylidene) (2,3) ethylidene]rhodanine having the structure:

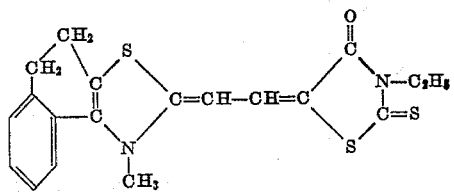

8. A dye selected from the group characterized by the following general formula:

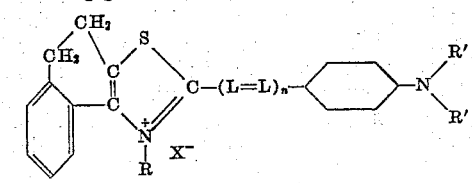

where R and R' respectively represent a member selected from the group consisting of alkyl and aralkyl groups, L represents a methine group, $n$ represents a positive integer from 1 to 2 and $X^-$ represents an acid radical.

9. 2 - p - dimethylaminostyryl-4,5-dihydro-β-naphthothiazole methiodide having the structure:

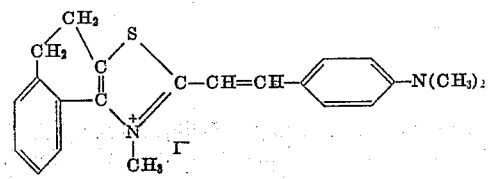

10. A dye selected from the group characterized by the following general formula:

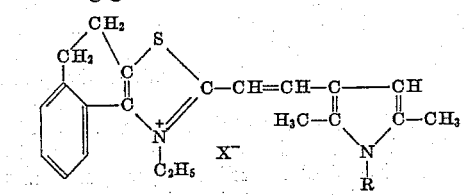

where R represents a member selected from the group consisting of alkyl, aralkyl and aryl groups and X represents an anion.

11. [1 - ethyl - 2(4,5 - dihydro-β-naphthothiazole)] [1-phenyl-2,5-dimethyl-3 pyrrole] dimethine cyanine iodide having the structure:

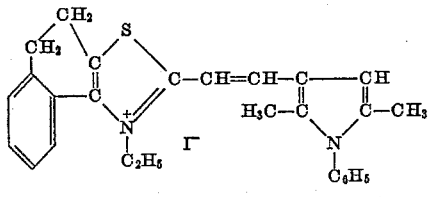

12. A process for preparing symmetrical carbocyanine dyes having the general formula

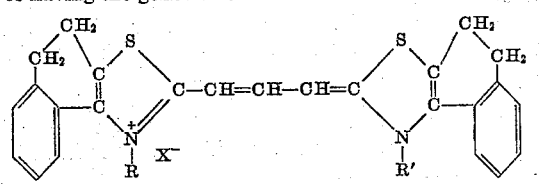

wherein R and R' respectively represent members of the group consisting of alkyl and aralkyl radicals and $X^-$ represents an acid radical from a quaternary salt having the general formula

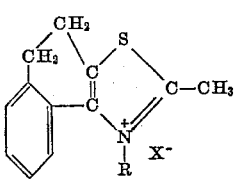

wherein R and $X^-$ have their previous significance comprising condensing the quaternary salt with an ester of an orthocarboxylic acid in an alkaline medium containing at least one constituent selected from the group consisting of pyridine and a mixture of pyridine and triethylamine.

13. A process for preparing unsymmetrical cyanine dyes having the general formula

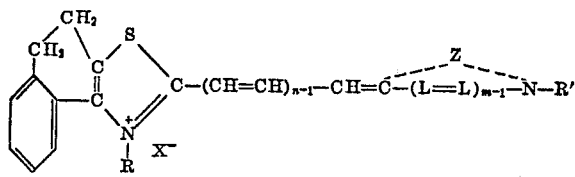

wherein R and R' respectively represent a member selected from the group consisting of alkyl and aralkyl groups, L represents a methine group, $m$ represents a positive integer from 1 to 2, $n$ represents a positive integer from 1 to 3, X⁻ represents an acid radical and Z represents the non-metallic atoms necessary to complete a heterocyclic nucleus containing from 5 to 6 atoms in the heterocyclic ring, said heterocyclic nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series from the quaternary salt having the general formula

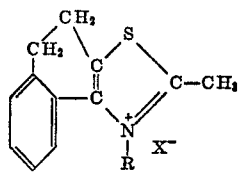

wherein R represents a member selected from the group consisting of alkyl and aralkyl groups and X⁻ represents an acid radical comprising condensing said quaternary salt with a heterocyclic ammonium quaternary salt having a reactive constituent selected from the group consisting of aryl aminovinyl groups, aryl aminobutadienyl groups, halogen atoms and thioether groups in a position selected from the alpha and gamma positions, in the presence of an alkaline condensing agent.

14. A process for preparing merocarbocyanine dyes containing the 4,5-dihydro-beta-naphthothiazole nucleus and having the general formula

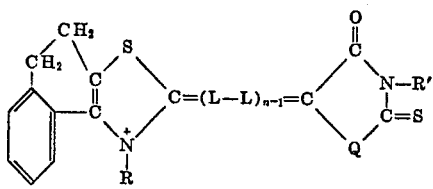

wherein R represents a member selected from the group consisting of alkyl, aralkyl and aryl groups, R' represents a member selected from the group consisting of alkyl and aryl groups, L is a methine group, $n$ is a positive integer of from 1 to 4 and Q is a member selected from the group consisting of oxygen, sulfur, selenium and =N—R' comprising condensing in an alkaline medium a quaternary salt having the general formula

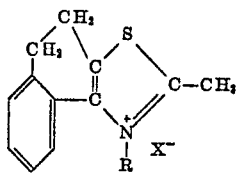

wherein R' represents a member selected from the group consisting of alkyl and aralkyl groups and X⁻ represents an acid radical with a ketomethylene heterocyclic compound having a reactive arylaminoethylene group in the 5 position.

15. A process for preparing pyrrolocarbocyanine dyes containing the 4,5-dihydro-beta-naphthothiazole nucleus and having the formula

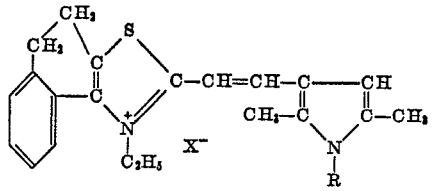

wherein R represents a member selected from the group consisting of alkyl, aralkyl and aryl groups and X⁻ represents an anion comprising condensing a quaternary salt having the formula

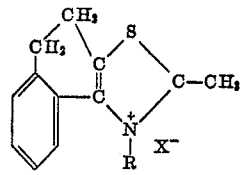

wherein R represents a member selected from the group consisting of alkyl and aralkyl groups and X⁻ represents an acid radical with an agent selected from the group consisting of 1-alkyl and 1-aryl-2,5-dimethyl-3-pyrrole carboxaldehyde in the presence of an alkaline condensing agent.

16. A process for preparing styryl dyes containing the 4,5-dihydro-beta-naphthothiazole nucleus and having the formula

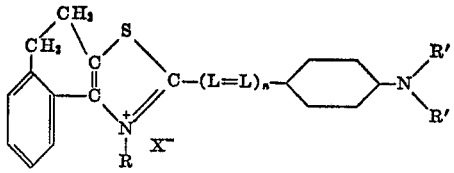

where R and R' respectively represent a member selected from the group consisting of alkyl and aralkyl groups, L represents a methine group, $n$ represents a positive integer from 1 to 2 and X⁻ represents an acid radical comprising condensing a quaternary salt having the formula

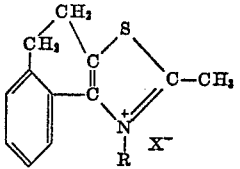

in which R represents a member selected from the group consisting of alkyl and aralkyl groups and X⁻ represents an acid radical with p-dialkyl aminobenzaldehyde in the presence of an alkaline catalyst.

References Cited in the file of this patent
UNITED STATES PATENTS

| | | |
|---|---|---|
| 2,166,736 | White et al. | July 18, 1939 |
| 2,263,749 | White et al. | Nov. 25, 1941 |
| 2,320,654 | Riester | June 1, 1943 |
| 2,322,015 | Hamer et al. | June 15, 1943 |
| 2,330,203 | Brooker et al. | Sept. 28, 1943 |
| 2,338,782 | Riester | Jan. 11, 1944 |
| 2,340,882 | Kendall | Feb. 8, 1944 |
| 2,353,164 | Kendall et al. | July 11, 1944 |
| 2,495,260 | Jenner et al. | Jan. 24, 1950 |

OTHER REFERENCES

Chemical Abstracts 16:3101 (Copy in S.L.) (Abstract of Brit. Med. Journal, 1922, I, 514–5–5).

Chemical Abstracts 19:530 (Copy in S.L.) (Abstract of Proc. Roy. Soc., London, 96B, 317–333, 1924).

Clerc: "Photography Theory and Practice," 3rd ed., page 151, Pitman Pub. Corp., N.Y., 1942. (Copy in Div. 60.)